(12) United States Patent
Prost-Fin et al.

(10) Patent No.: US 7,602,278 B2
(45) Date of Patent: Oct. 13, 2009

(54) STEERING WHEEL ASSEMBLY FOR A MOTOR VEHICLE

(75) Inventors: Marc Prost-Fin, Berlin (DE); Friederike Keudel, Berlin (DE); Delf Neumann, Berlin (DE)

(73) Assignee: Takata-Petri AG, Aschaffenburg (DE)

(*) Notice: Subject to any disclaimer, the term of this patent is extended or adjusted under 35 U.S.C. 154(b) by 0 days.

(21) Appl. No.: 11/826,827

(22) Filed: Jul. 18, 2007

(65) Prior Publication Data
US 2008/0023253 A1 Jan. 31, 2008

Related U.S. Application Data

(63) Continuation of application No. PCT/DE2006/000096, filed on Jan. 18, 2006.
(60) Provisional application No. 60/644,575, filed on Jan. 19, 2005.

(30) Foreign Application Priority Data

Jan. 19, 2005 (DE) .................. 10 2005 003 187
Nov. 10, 2005 (DE) .................. 10 2005 054 640

(51) Int. Cl.
*B60Q 1/00* (2006.01)
(52) U.S. Cl. .......................... 340/438; 701/1
(58) Field of Classification Search ............ 340/438, 340/435, 436, 459, 461; 345/156, 173; 701/1
See application file for complete search history.

(56) References Cited

U.S. PATENT DOCUMENTS

| 4,722,550 | A |   | 2/1988  | Imaoka et al.   |         |
|-----------|---|---|---------|-----------------|---------|
| 5,197,562 | A |   | 3/1993  | Kakinami et al. |         |
| 5,477,457 | A |   | 12/1995 | Okada           |         |
| 5,488,353 | A |   | 1/1996  | Kawakami et al. |         |
| 5,585,785 | A |   | 12/1996 | Gwin et al.     |         |
| 5,666,102 | A | * | 9/1997  | Lahiff          | 340/438 |
| 5,689,241 | A |   | 11/1997 | Clarke, Sr. et al. |      |
| 5,793,292 | A |   | 8/1998  | Ivey, Jr.       |         |
| 5,821,935 | A | * | 10/1998 | Hartman et al.  | 340/438 |
| 6,125,320 | A |   | 9/2000  | Hellmann et al. |         |
| 6,253,131 | B1| * | 6/2001  | Quigley et al.  | 340/461 |
| 6,373,472 | B1| * | 4/2002  | Palalau et al.  | 345/173 |

(Continued)

FOREIGN PATENT DOCUMENTS

CN 1424968 A 6/2003

(Continued)

OTHER PUBLICATIONS

Burnett, A Road-Based Evaluation of a Head-Up Display for Presenting Navigation Information, Proceedings of HCI International Conference, Jun. 23-27, 2003, pp. 180-184, vol. 3, Greece.

(Continued)

*Primary Examiner*—John A Tweel, Jr.
(74) *Attorney, Agent, or Firm*—Foley & Lardner LLP

(57) ABSTRACT

A steering wheel assembly for a motor vehicle comprises a steering wheel and a display device mounted on the steering wheel. The display device is functionally linked with a sensor device to be mounted on the motor vehicle for detecting a parameter of the motor vehicle and adapted to display the parameter detected by the sensor device. The sensor device is coupled to a functional unit of the motor vehicle for passing on or converting energy and/or information, the functional unit being adapted and configured to display to a driver a suggestion for adjusting the parameter via the display device. The functional unit is associated with an actuator unit of the motor vehicle, which is used to adjust the parameter in accordance with the suggestion displayed by the functional unit.

57 Claims, 9 Drawing Sheets

U.S. PATENT DOCUMENTS

| | | | |
|---|---|---|---|
| 6,449,535 B1* | 9/2002 | Obradovich et al. | 701/1 |
| 6,450,573 B1 | 9/2002 | Yamaguchi et al. | |
| 6,476,730 B2 | 11/2002 | Kakinami et al. | |
| 6,739,620 B2* | 5/2004 | Derrick | 280/731 |
| 6,837,540 B2 | 1/2005 | Yamaguchi et al. | |
| 6,860,508 B2 | 3/2005 | Keutz | |
| 6,908,149 B1 | 6/2005 | Yamaguchi et al. | |
| 6,922,616 B2* | 7/2005 | Obradovich et al. | 701/1 |
| 6,927,694 B1 | 8/2005 | Smith et al. | |
| 6,983,170 B2 | 1/2006 | Stulberger | |
| 7,089,099 B2* | 8/2006 | Shostak et al. | 701/32 |
| 7,116,234 B2 | 10/2006 | Mohri | |
| 7,124,004 B2* | 10/2006 | Obradovich | 701/30 |
| 7,258,190 B2 | 8/2007 | Mattes et al. | |
| 7,280,046 B2 | 10/2007 | Berg et al. | |
| 7,413,047 B2 | 8/2008 | Brown et al. | |
| 7,414,520 B2* | 8/2008 | Meißner | 340/438 |
| 7,460,940 B2 | 12/2008 | Larsson et al. | |
| 2002/0053792 A1 | 5/2002 | Yamaguchi et al. | |
| 2002/0053793 A1 | 5/2002 | Yamaguchi et al. | |
| 2002/0145512 A1 | 10/2002 | Sleichter et al. | |
| 2003/0023353 A1 | 1/2003 | Badaneh | |
| 2003/0067148 A1 | 4/2003 | Keutz | |
| 2003/0222490 A1 | 12/2003 | Sakai | |
| 2004/0055806 A1 | 3/2004 | Masuda et al. | |
| 2004/0209594 A1 | 10/2004 | Naboulsi | |
| 2005/0021190 A1* | 1/2005 | Worrell et al. | 701/1 |
| 2007/0043505 A1 | 2/2007 | Leicht | |
| 2008/0061954 A1* | 3/2008 | Kulas | 340/438 |
| 2008/0173127 A1* | 7/2008 | Ackert et al. | 74/552 |
| 2008/0211651 A1* | 9/2008 | Beutnagel-Buchner et al. | 340/459 |

FOREIGN PATENT DOCUMENTS

| | | |
|---|---|---|
| DE | 39 12 359 A1 | 10/1990 |
| DE | 3917613 A1 | 12/1990 |
| DE | 196 46 104 C1 | 4/1998 |
| DE | 197 34 307 A1 | 2/1999 |
| DE | 198 57 900 C1 | 6/2000 |
| DE | 199 43 595 A1 | 3/2001 |
| DE | 101 09 680 A1 | 10/2001 |
| DE | 200 14 731 U1 | 2/2002 |
| DE | 101 39 412 A1 | 3/2003 |
| DE | 203 02 628 U1 | 6/2003 |
| DE | 203 16 865 U1 | 2/2004 |
| DE | 102 41 267 A1 | 3/2004 |
| DE | 103 03 010 A1 | 8/2004 |
| DE | 103 52 733 A1 | 10/2004 |
| DE | 103 60 176 A1 | 7/2005 |
| DE | 603 13 537 T2 | 1/2008 |
| EP | 1 302 372 A1 | 4/2003 |
| EP | 1 484 234 A1 | 12/2004 |
| EP | 1 502 835 A1 | 2/2005 |
| EP | 1 077 154 B1 | 4/2007 |
| EP | 1 378 391 B1 | 5/2007 |
| FR | 2744976 A1 | 8/1997 |
| JP | 10-181380 A | 7/1998 |
| JP | 2000-020900 A | 1/2000 |
| JP | 2005-135037 A | 5/2005 |
| WO | WO 98/03365 A1 | 1/1998 |
| WO | WO 99/52761 A1 | 10/1999 |
| WO | WO 2004/007237 A1 | 1/2004 |
| WO | WO 2004/068439 A1 | 8/2004 |
| WO | WO 2004/106145 A1 | 12/2004 |

OTHER PUBLICATIONS

Burnett, Usable Vehicle Navigation Systems: Are We There Yet?, Vehicle Electronic Systems 2000, Jun. 29-30, 2000, pp. 3.1.1-3.1.11.

Driver Focus-Telematics Working Group, Statement of Principles, Criteria and Verification Procedures on Driver Interactions with Advanced In-Vehicle Information and Communication Systems, Ver. 2.0, Apr. 15, 2002, 65 pages.

Gish et al., Sensory and Cognitive Factors Affecting Automotive Head-Up Display Effectiveness, Transp. Research Record 1694, Paper No. 99-0736, pp. 10-19.

Green, "How Long does It Take to Stop?" Methodological Analysis of Driver Perception-Brake Times, Transp. Human Factors, pp. 195-216, Vol. 2, No. 3.

Hiramatsu, A Note for Common Understanding of Driver Assistance in Advanced Systems, Informal document No. WP.29-134-24, Nov. 16-19, 2004, agenda item 3.4, Geneva.

Lee et al., Can Collision Warning Systems Mitigate Distraction Due to In-Vehicle Devices?, pp. 1-9.

U.S. Department of Transportation, NHTSA, In-Vehicle Crash Avoidance Warning Systems: Human Factors Considerations, Summary Report DOT HS 808 531, Feb. 1997, 38 pages.

Gish et al., Sensory and Cognitive Factors Affecting Automotive Head-Up Display Effectiveness, Transp. Research Record 1694, Paper No. 99-0736, pp. 10-19, Jul. 18, 2007.

Green, "How Long does It Take to Stop?" Methodological Analysis of Driver Perception-Brake Times, Transp. Human Factors, pp. 195-216, vol. 2, No. 3, Jul. 18, 2007.

Lee et al., Can Collision Warning Systems Mitigate Distraction Due to In-Vehicle Devices?, pp. 1-9, Jul. 18, 2007.

* cited by examiner

US 7,602,278 B2

STEERING WHEEL ASSEMBLY FOR A MOTOR VEHICLE

CROSS-REFERENCE TO RELATED PATENT APPLICATIONS

This application is a continuation application of International Application PCT/DE2006/000096, which has an international filing date of Jan. 18, 2006; this International Application was not published in English, but was published in German as WO 2006/076904, both of which are incorporated herein by reference in their entirety.

BACKGROUND

The invention relates to a steering wheel assembly for a motor vehicle.

Such steering wheel assemblies comprise at least one steering wheel which is generally provided with a hub body rotatably mounted about a steering axis, which is connected to a steering wheel rim via at least one spoke, which in turn at least partially encloses the hub body and/or the steering axis (transversely to the steering axis). The steering wheel rim may, in this case in particular, be configured to be enclosed so that it surrounds the hub body in an annular manner.

SUMMARY

One embodiment relates to a steering wheel assembly for a motor vehicle. The steering wheel assembly comprises: a steering wheel; a display device arranged on the steering wheel and which cooperates with a sensor device arranged on the motor vehicle for detecting at least one parameter of a motor vehicle and which displays the parameter detected by the sensor device. The steering wheel assembly further comprises a functional unit of the motor vehicle for forwarding or converting energy and/or information coupled to the sensor device, the functional unit being configured to display to a driver via the display device a suggestion for adjusting a parameter of the motor vehicle. An actuator unit of the motor vehicle is associated with the functional unit, by which the parameter may be adjusted according to the suggestion of the functional unit. The actuator unit is arranged on the steering wheel. The actuator unit is configured for accepting and declining the suggestion by acting on the actuator unit.

Yet another embodiment relates to a method for adjusting a limit value of the speed of a motor vehicle with a steering wheel assembly. The steering wheel assembly comprises: a steering wheel; a display device arranged on the steering wheel and which cooperates with a sensor device arranged on the motor vehicle for detecting at least one parameter of a motor vehicle and which displays the parameter detected by the sensor device. The steering wheel assembly further comprises a functional unit of the motor vehicle for forwarding or converting energy and/or information coupled to the sensor device, the functional unit being configured to display to a driver via the display device a suggestion for adjusting a parameter of the motor vehicle. An actuator unit of the motor vehicle is associated with the functional unit, by which the parameter may be adjusted according to the suggestion of the functional unit. The actuator unit is arranged on the steering wheel. The actuator unit is configured for accepting and declining the suggestion by acting on the actuator unit. The method comprises the following: detecting a limit value of the speed of a motor vehicle by the sensor device; displaying the limit value of the speed detected by the sensor device by the display device, the acceptance of a limit value of the speed detected by the sensor device being suggested to a driver by the cruise controller via the display device; accepting or declining the suggestion by an actuator unit arranged on the steering wheel; and after accepting the suggestion, regulating the speed of the motor vehicle by the cruise controller to the limit value of the speed.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
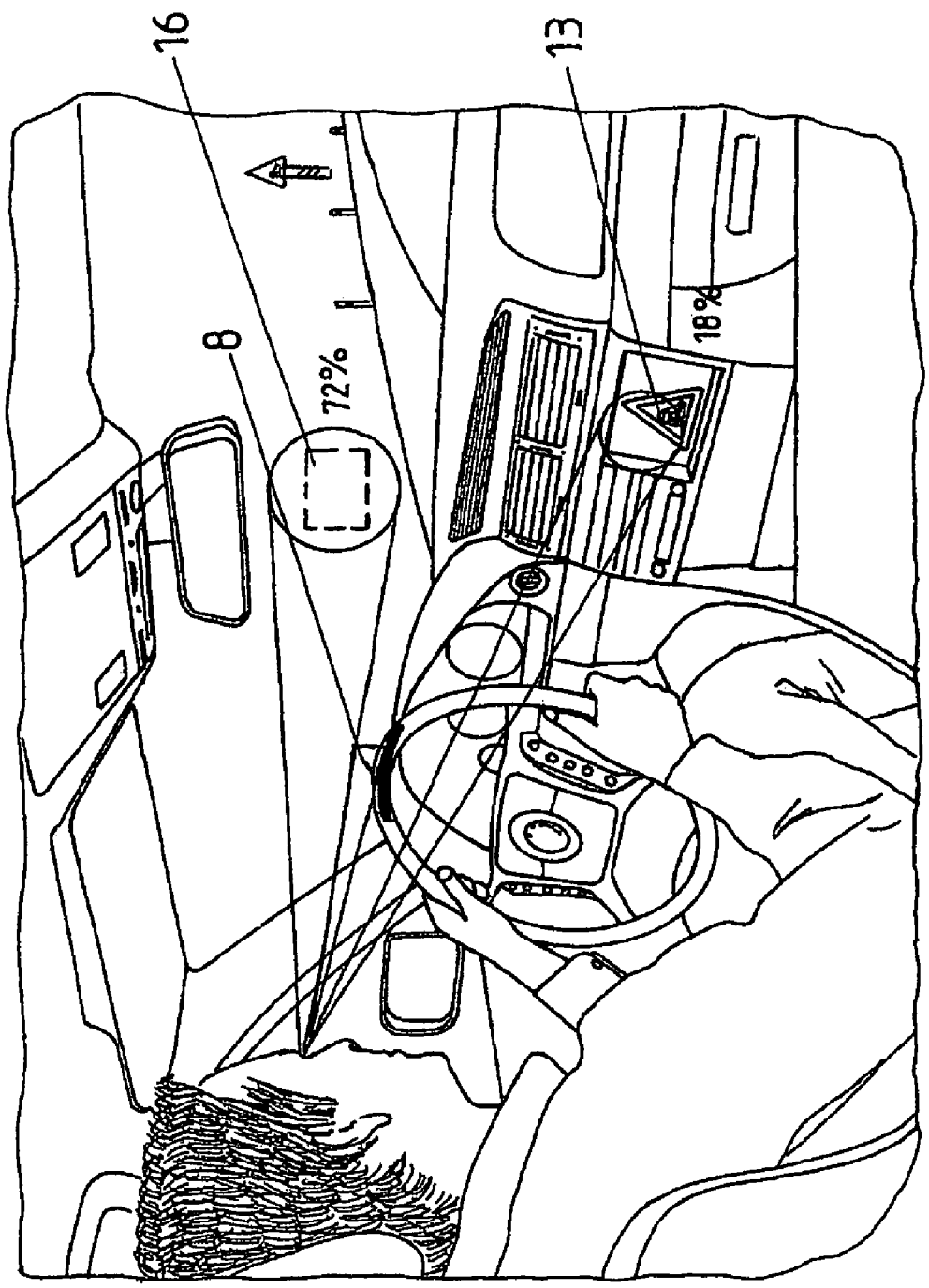
FIG. 1 is a perspective view of the viewing directions of a driver with known communication interfaces and with a variant of a steering wheel assembly according to an embodiment, with a display device arranged in a steering wheel rim.

According to an embodiment, the steering wheel assembly comprises a steering wheel and a display device arranged on the steering wheel, which cooperates with a sensor device to be arranged on the motor vehicle for detecting at least one parameter of a motor vehicle and which is provided for displaying the parameter detected by the sensor device, a functional unit of the motor vehicle for forwarding or converting energy and/or information being coupled to the sensor device and the functional unit being designed and provided to display to a driver via the display device a suggestion for adjusting a parameter of the motor vehicle, and an actuator unit of the motor vehicle being associated with the functional unit, by which the parameter may be adjusted according to the suggestion of the functional unit.

In the steering wheel assembly according to an embodiment, namely by the arrangement of the display device on the steering wheel, the display of the parameter takes place in the continuous field of vision of a driver, as a result of which the display is always very easily visible and the attention of the driver is not substantially diverted from the surrounding traffic conditions by viewing the display device. This leads, on the whole, to an improvement in the comfort and the safety of a motor vehicle, these advantages already being substantially achieved by a steering wheel assembly with a steering wheel and a display device arranged on the steering wheel, which cooperates with a sensor device to be arranged on the motor vehicle for detecting a parameter of a motor vehicle and which is provided for displaying the parameter detected by the sensor device. By use of the functional unit which, in principle, is not necessarily coupled to the sensor device, additional advantages can be achieved.

The parameter which may be detected by the sensor device also encompasses limit values of the parameter which, for example, are predetermined externally, and which may be detected by the sensor device.

The functional unit may, for example, be a cruise controller for regulating the speed of a motor vehicle to a limit value of the speed (speed limit) or, for example, evaluation electronics which detect a gear to be used depending on a current rotational speed of an engine and a current gear of a transmission of the motor vehicle. Similarly, by use of the cruise controller, the speed of a motor vehicle may be adapted to a predeterminable distance (safe distance) from a motor vehicle ahead. Similarly, such a functional unit may be control electronics which are designed and provided for automatically parking a motor vehicle.

Preferably, the actuator unit which serves for actuating (activating, deactivating and regulating) the functional unit, is arranged on the steering wheel. The steering wheel may, for example, comprise a hub body rotatably mounted about a steering axis, to which a steering wheel rim at least partially surrounding the hub body transversely to the steering axis may be fastened via at least one spoke. The actuator unit may therefore be arranged on the spoke, the steering wheel rim, as well as on the hub body. Advantageously, the actuator unit is arranged on the steering wheel, such that it may be actuated by a driver without said driver having to take his or her hands off the steering wheel.

Preferably, the adjustment of the parameter encompasses a confirmation of, or an alteration to, the parameter, which may be undertaken by the actuator unit which is configured and provided for accepting and declining the suggestion by acting on the actuator unit. If, therefore, for example a current limit value of the speed, detected (for example externally predetermined) by the sensor device is suggested, the driver may accept, decline or adjust said limit value by a single actuation of the actuator unit, i.e. increase and/or lower the suggested limit value of the speed and optionally immediately or subsequently accept said limit value.

In another embodiment, the functional unit provides a predefinable time interval within which the actuator unit has to be actuated for the effective acceptance of the suggestion.

By the aforementioned measures according to embodiments, a driver may drive a motor vehicle comfortably and safely, the individual responsibility of the driver not being curtailed with such a design of a person/machine interface.

In a particularly preferred embodiment, the functional unit is configured as a cruise controller which serves to restrict the current speed (parameter) of a motor vehicle in a driving state, to a limit value of the speed (speed limit). In a variant, the cruise controller preferably regulates the speed of the motor vehicle to the limit value of the speed displayed by the display device. In other words, the cruise controller effects a substantially constant speed, which may correspond to the current (prescribed) speed limit.

It is preferably provided that the suggestion offers the limit value of the speed detected by the sensor device for acceptance, the acceptance of the suggestion effecting the restriction of the speed of the motor vehicle to the limit value of the speed by the cruise controller.

In an alternative embodiment, the parameter is a distance from a vehicle ahead. Preferably the suggestion of the functional unit (cruise controller) offers such a distance from the vehicle ahead for acceptance, the acceptance of the suggestion effecting the regulation of the speed of the motor vehicle by the cruise controller, such that the distance from the vehicle ahead is maintained substantially constant.

For adopting the limit value of the speed (speed limit) displayed by the display device, a single actuation of the actuator unit suffices, in particular. Said actuator unit may, for example, be configured as a pushbutton switch which is pressed once for activating the cruise controller and/or for confirming the limit value of the speed displayed by the display device.

In this manner, the cruise controller may be activated in a comfortable manner, at the same time the attention of the driver not being diverted from the traffic conditions due to the display of the speed limit in the field of vision of a driver, which as a whole increases the safety of the motor vehicle.

In another embodiment, the functional unit provides a tolerance range which may be activated by the actuator unit and by which the parameter is intended to fall below and/or exceed a limit value of the parameter.

Preferably, the sensor device is provided and designed to read a (current) limit value of the parameter from a display in the surroundings of a motor vehicle. Furthermore, preferably the sensor device is provided and designed to select the limit value of the parameter from a database, in particular a GPS database.

With a functional unit in the form of a cruise controller which, as a parameter, limits and/or regulates the speed of the motor vehicle to a limit value of the speed, the current predetermined limit value of the speed of the steering wheel assembly may therefore be read, for example by an optical sensor (for example a digital camera) from a road sign or another display. In a further variant, the sensor device is provided and designed to select the limit value of the parameter (for example a prescribed speed limit) from a data store arranged in the surroundings of a motor vehicle. Moreover, the limit value of the parameter (for example a prescribed speed limit) may be transferred by RFID (radio frequency identification) to the steering wheel assembly (for example via a stationary transponder in the surroundings of the motor vehicle as a storage medium for a limit value of the speed predetermined at the location of the transponder, which may be selected by a sensor device arranged on the motor vehicle).

In a further embodiment, a transmission unit is provided which serves to transmit output signals of the sensor device to the display device.

In a preferred embodiment, it is provided that, as parameters, a current rotational speed of an engine and/or a gear of a transmission of a motor vehicle are detected by the sensor device, preferably the suggestion detected by the functional unit relating to a gear to be used, the acceptance of which by a driver, in motor vehicles with an automatic transmission, effecting an automatic engagement of the suggested gear.

In an embodiment, the functional unit is configured as evaluation electronics connected to the display device, which are designed and provided to determine the suggestion concerning a gear to be used at least depending on the current rotational speed and the current gear and to display said suggestion to a driver via the display device.

In an alternative embodiment, the sensor device is configured for detecting further parameters of a motor vehicle, which may preferably be displayed by the display device, said parameters preferably being distances between a motor vehicle and objects in the surroundings of the motor vehicle.

The sensor device is preferably provided and designed to convert the distances into a dimension of a parking space. In this connection, the sensor device is preferably provided and designed to detect whether a parking space is large enough in the surroundings of the motor vehicle, in order to park the motor vehicle on said parking space. Moreover, the sensor device is preferably configured to display information about a parking space via the display device.

In another embodiment, the functional unit is configured as control electronics connected to the sensor device, which are designed and provided for automatically parking a motor vehicle.

In one embodiment, the display device is arranged on a steering wheel rim of the steering wheel which at least partially surrounds a steering axis of the steering wheel (transversely to the steering axis), preferably the display device being arranged in a straight-ahead position of the steering wheel—relative to a state of the steering wheel installed in a motor vehicle—along the vertical vehicle axis above the steering axis and namely, in particular, in the 12 o'clock position. The display device is, therefore, advantageously preferably positioned on the steering wheel rim such that it is arranged along the vertical vehicle axis at the highest point of the steering wheel rim in the straight-ahead driving position of the steering wheel rim. As a result, the display device may be particularly easily viewed by a driver, because for viewing the display device the driver only has to alter his or her viewing direction slightly compared to the straight-ahead viewing direction (parallel to the longitudinal axis of the vehicle). The display device is thus always located in the field of vision of the driver, so that simple (clear) optical signals are always visible, even when the driver does not focus on the display device.

In a further embodiment, at least one detection device arranged on the steering wheel is provided for detecting an attentive state of a driver of a motor vehicle, the detection device serving to activate the display device depending on the detected attentive state of the driver.

The attentive state of a driver may be measured, i.e. classified, using different indicators. Such indicators are, for example, the viewing direction of the driver, it being of significance, in particular, how long (in terms of time) the viewing direction is diverted from the straight-ahead viewing direction. This may be detected by a detection device.

In a particularly preferred embodiment, the detection device is configured, for example for detecting the viewing direction of a driver, as a camera (for example a digital camera). An evaluation of an image detail detected by the camera takes place by suitable image recognition software. Alternatively, the detection device may also be an optical sensor (for example a combination of a light transmitter and a light receiver).

Preferably the detection device is arranged adjacent to the display device. This is advantageous as, as a result, the probability of the detection device being covered by the hand of a driver is reduced when driving the motor vehicle, as a driver generally will not cover the display device, in particular an optical display, with his or her hands in order not to restrict said display device in its functionality.

In an embodiment, the detection device is arranged on the steering wheel rim.

The detection device, for example in the form of a camera, is particularly preferably arranged along a vertical vehicle axis above the steering axis, in particular in the 12 o'clock position, in a straight-ahead driving position of the steering wheel.

Preferably, the display device comprises at least two display elements (for example a screen and an adjacent LED field) such a display element also being able to comprise a plurality of LED fields. Particularly preferably, the detection device is arranged along the steering wheel rim, i.e. in a rotational direction of the steering wheel rim between the at least two display elements.

Preferably, in this case the distance between the detection device and respectively one of the at least two display elements of the display device along the steering wheel rim is smaller than the width of at least one of the two display elements along the steering wheel rim (i.e. in the rotational direction of the steering wheel rim). The detection device thus has only a small spacing from at least one of the two display elements in the rotational direction.

In a further embodiment, a plurality of detection devices are provided, in particular in the form of cameras (for example digital cameras), preferably the detection devices being arranged along the steering wheel rim such that at least one of the detection devices is arranged irrespective of a position of the steering wheel along the vertical vehicle axis above the steering axis.

Advantageously, the one detection device and/or the further detection devices may also be used to control other warning and/or safety devices, such as a seat ramp or a motorized safety belt, depending on the attentive state of a driver.

In an embodiment, the steering wheel comprises a hub body which may be rotated about the steering axis and which is connected to the steering wheel rim of the steering wheel via at least one spoke. Preferably a region of the steering wheel rim is provided which comprises the at least one display device.

An airbag may be deployed to protect a driver in a main deployment direction extending along the steering axis and when deployed may impact against the region of the steering wheel rim transversely to the steering axis, the region of the steering wheel rim preferably cooperating with the airbag such that said airbag is deflected for protecting the steering wheel rim and the airbag and, in particular, the display device in the main deployment direction.

Preferably, the region for deflecting an airbag which is being deployed comprises a deflecting ramp i.e. it is partially inclined relative to a main deployment direction of the airbag, which coincides with the steering axis of the steering wheel. The inclination may be configured such that the airbag strikes the region at the same angle (angle of incidence) at which it is also deflected (glancing angle). Both angles are thus measured relative to a vertical line, which is perpendicular to an impact region of the steering wheel rim, against which the airbag impacts when deployed.

Moreover, the region for deflecting the airbag which is being deployed preferably comprises a surface with a low coefficient of friction and, preferably, said coefficient of friction is lower than the coefficient of friction of adjacent regions of the steering wheel rim. It is essential, therefore, that the surface is formed such that the friction between the surface and the airbag is as low as possible and the airbag is thus able to slide easily on the region. Depending on the airbag material, the surface of the region on which the airbag is intended to slide, may be configured particularly smoothly, for example.

The aforementioned shape of the region of the steering wheel rim serving to deflect the airbag (and/or the nature of the surface of this region), protects not only the steering wheel rim and the display device from an airbag which is being deployed, but also the airbag itself, which further improves the safety of a motor vehicle.

The display device is particularly preferably configured as an optical display. In this case, the optical display preferably comprises at least one LED (light emitting diode).

Preferably the optical display is further formed by a plurality of LEDs and preferably comprises an LED field the LEDs thereof being able to be activated such that graphic symbols are able to be shown (corresponding to the number of LEDs). Such an LED field may also be configured in a linear manner.

In a particularly preferred embodiment, the optical display comprises at least one screen. In this connection it is preferably an LCD (liquid crystal display). However other display techniques may also be used.

In an alternative embodiment, the display device is configured as an acoustic display or a haptic display. It is possible to combine optical, acoustic and haptic displays with one another. Haptic displays are, for example, vibrators which are preferably arranged on the steering wheel rim. So that said haptic displays may be felt in every grip position, such a haptic display may surround the steering wheel rim in an annular manner (may be rotated along the steering wheel rim in the rotational direction of the steering wheel rim). Haptic displays are advantageously arranged on those regions of a motor vehicle which are permanently in contact with a person, in particular the driver (steering wheel, seat, etc.).

A further embodiment is a method for regulating a parameter of a motor vehicle in which the parameter of a motor vehicle is detected by the sensor device and the parameter detected by the sensor device is displayed by the display device, preferably the limit value of the speed being detected as a parameter of the motor vehicle.

Preferably the speed of the motor vehicle is regulated by a cruise controller to the limit value of the speed, the cruise controller being activatable by actuating an actuator unit arranged in the region of the steering wheel.

A currently valid limit value of the speed (speed limit) may thus, for example, be detected or actively detected from a database, for example by an optical sensor. This detected limit value of the speed is displayed to a driver via the display device as a suggestion, the driver being able to accept said suggestion by the actuator unit, for example via a single push on a button. As a result, the cruise controller regulates the speed of the motor vehicle to this speed limit and again displays, with an updated speed limit, a corresponding suggestion via the display device. Moreover, a displayed speed limit may be declined and/or altered via the actuator unit.

In a further embodiment, the rotational speed of an engine of the motor vehicle is detected as a parameter, preferably the current gear of a transmission of the motor vehicle in a driving state being detected as a further parameter.

A preferred embodiment of the method further provides that, at least depending on the gear used in a driving state of the motor vehicle and the current rotational speed, a gear to be used is automatically suggested and is displayed via the display device.

A further embodiment of the method provides that further parameters of a motor vehicle are detected by the sensor device, preferably distances between a motor vehicle and objects in the surroundings of the motor vehicle being detected as parameters.

Preferably, the automatically detected distances are converted into the variable of a parking space. In other words, the size of a parking place (parking space) is intended to be detected and/or whether the size of the parking space is sufficient, in order to stop, i.e. to park, the vehicle thereon by the sensor device. Such a parking space may, for example, be a parking space between two vehicles parked along a road, the sensor device being able to detect, when driving past, the distance between the two vehicles along the road and thus being able to detect and/or estimate automatically the size of the parking space (parking place).

A preferred embodiment of the method according to an embodiment provides that a free parking space is identified and measured by the sensor device, it being automatically verified whether the parking space is sufficiently large in order to park the motor vehicle thereon. Moreover, via the display device the detected information is displayed to the driver about the detected parking space and namely, in particular, whether said parking space is sufficiently large in order to park the motor vehicle on the parking space. In this connection, the sensor device also takes into account the space which an average vehicle driver requires for parking. It is also conceivable that the sensor device automatically measures how the motor vehicle may be moved onto the parking space and this is displayed to a driver via the display device.

As a result, the comfort of the motor vehicle is advantageously improved. Moreover, the detection, according to an embodiment, of the distances between the motor vehicle and objects in the surroundings of the motor vehicle allows reliable parking, as due to the knowledge of the size of the parking space the danger of collision with an adjacent object is reduced.

In one embodiment, the sensor device may also be used for other functions. In other words, during normal straight-ahead driving above a specific (predefinable) threshold speed the sensor device may be used to detect the distance from vehicles driving ahead or oncoming vehicles and/or obstructions and to activate a collision warning device (for example an optical, acoustic and/or haptic display) whilst with slow driving, at a speed below the threshold speed, the same sensor device may be used to detect and to measure potential parking spaces for the motor vehicle.

Figure 2:
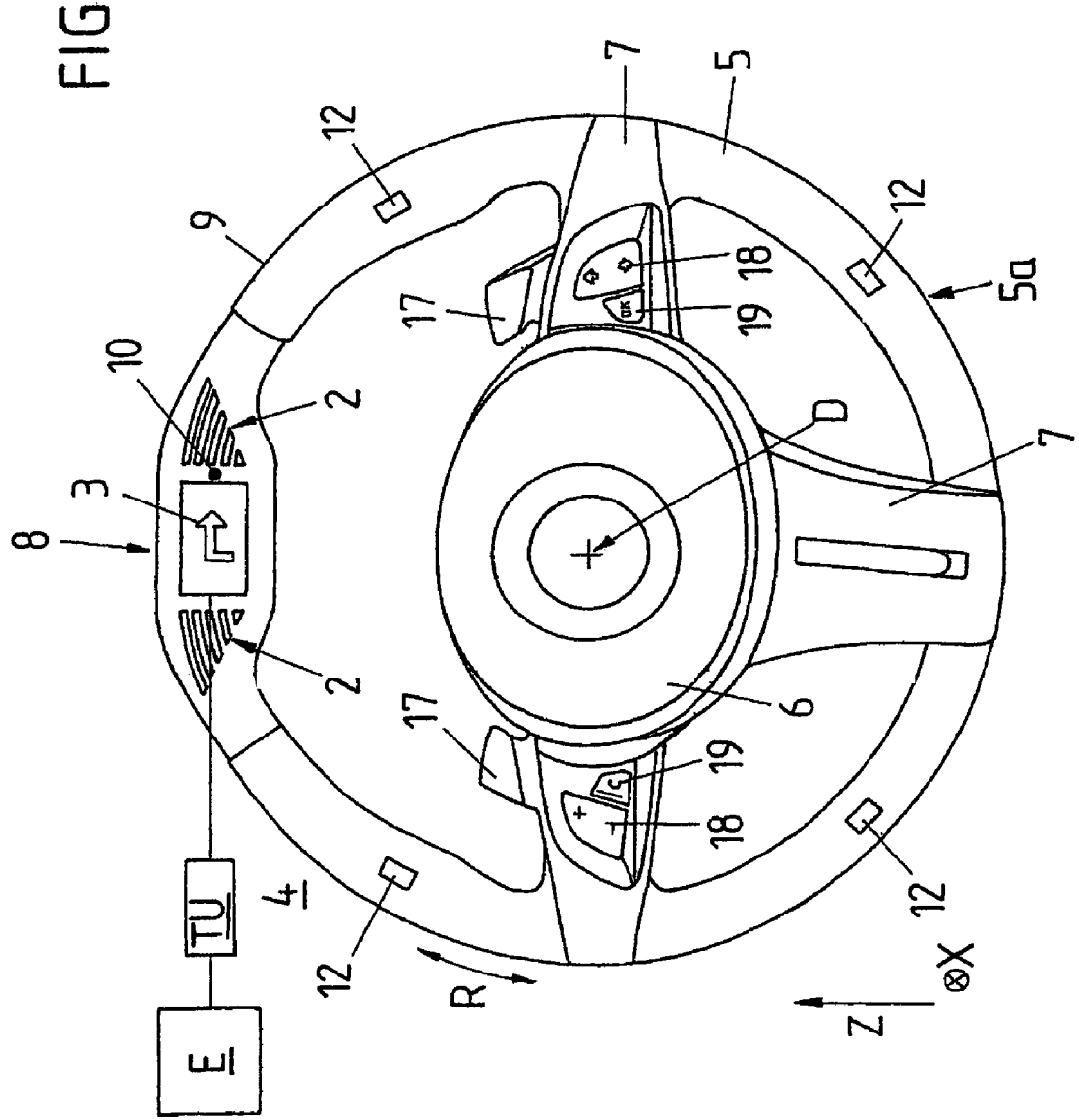
FIG. 2 is a plan view of a steering wheel assembly according to an embodiment, with an LCD (display device) in the steering wheel rim.

FIG. 2 shows a plan view of a steering wheel assembly 4 with a steering wheel 5a which comprises a steering wheel rim 5 and a hub body 6, which is connected to the steering wheel rim 5 via three spokes 7.

The hub body 6 is rotatably mounted about a steering axis D which is perpendicular to the paper plane and is surrounded by the steering wheel rim 5 of annular configuration transversely to the steering axis D in a rotational direction R of the steering wheel rim 5. The three spokes 7 are substantially arranged in a T-shaped manner—relative to an installed state of the steering wheel 5a—in a straight-ahead driving position of the steering wheel rim 5 one of the three spokes 7 extending substantially along the vertical vehicle axis z (the steering wheel 5a may be inclined toward the vertical vehicle axis z and/or have an adjustable inclination) whilst the two other spokes 7 projecting horizontally in an opposing direction from the hub body 6 and, relative to its straight-ahead driving position, dividing the steering wheel rim 5 into a half extending above the steering axis D and a half extending below the steering axis D.

The steering wheel assembly 4 comprises a display device 8 in the form of an optical display for displaying driving information. A first display element of the display device 8 is configured as a rectangular screen 3 and namely as an LCD (liquid crystal display) which in the straight-ahead driving position, shown in FIG. 2, of the steering wheel rim 5 is arranged in the upper half of the steering wheel rim 5, and namely substantially such that relative to the straight-ahead driving position of the steering wheel rim is arranged at the highest point (relative to the vertical vehicle axis z) of the steering wheel rim 5, i.e. in the 12 o'clock position. In this connection, the screen 3 is fitted into an upper face of the steering wheel rim 5 facing a driver, so that it opposes the driver along the vehicle longitudinal axis x and faces said driver.

The screen 3 is arranged along the steering wheel rim 5, i.e. in the rotational direction R of the steering wheel rim 5, between two further display elements of the display device 8, which are respectively formed from five LED fields 2. The LED fields 2 are configured to extend longitudinally (in a linear manner) in the rotational direction R, in the straight-ahead driving position of the steering wheel rim 5 the respective five LED fields 2 being arranged along the vertical vehicle axis z above one another and becoming wider toward an outer peripheral edge 9 of the steering wheel rim 5 (in the rotational direction R), i.e. the longitudinal extension of the LED fields 2 in the rotational direction R increases with the increasing radial distance from the hub body 6 of the steering wheel 5*a*.

Figure 8:
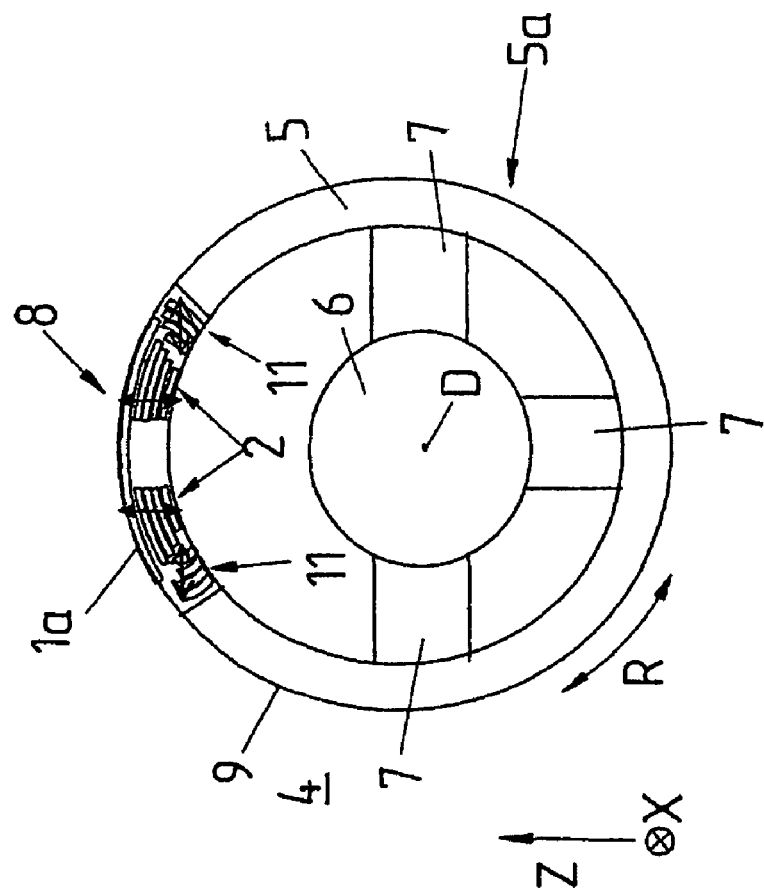
FIG. 8 is a modification of a steering wheel assembly of the type shown in FIG. 2.

FIG. 8 shows a plan view of a modification of the steering wheel 5 shown in FIG. 2, in which in contrast to FIG. 2 a further LED field 1 of curved configuration extends along an outer (in a radial direction perpendicular to the rotational axis D) peripheral edge 9 of the steering wheel rim 5 and namely substantially over the entire upper half of the steering wheel rim 5. The LED field 1 is divided in the rotational direction R into three segments 1*b*, 1*a* and 1*c* of approximately the same length, the middle segment 1 *a* being arranged along the vertical vehicle axis z (in the straight-ahead driving position of the steering wheel rim 5) above the screen 3 and the LED fields 2 (respectively four on both sides of the screen 3 in the rotational direction R). Each of these segments 1*a*, 1*b* and 1*c* may be activated separately for displaying driving information.

Figure 9:
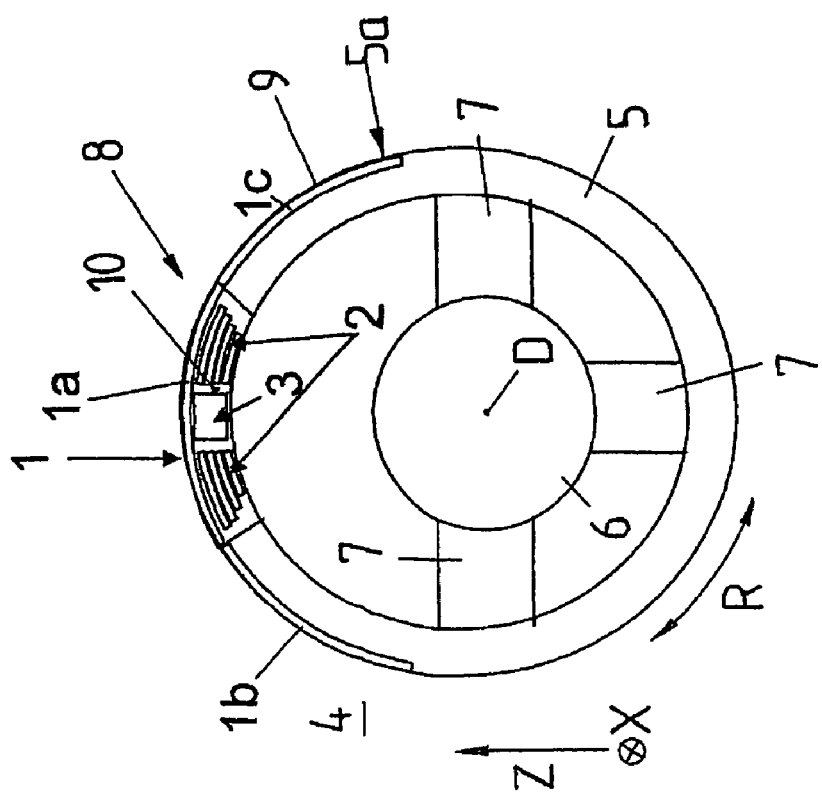
FIG. 9 is a modification of a steering wheel assembly of the type shown in FIG. 8.

FIG. 9 shows a further modification of the steering wheel assembly 4 shown in FIG. 8 in which, in contrast to FIG. 8, no screen 3 is provided (said screen may naturally also be used here) and the further LED field 1 merely uses the middle segment 1*a*. Moreover, no camera 10 is provided but it may also be used here. Additionally, on sides of the LED fields 2 facing away from one another four additional LED fields 11 are respectively arranged, which are arranged transversely to the rotational direction R on the upper face of the steering wheel rim 5. These additional LED fields 11 may be activated separately and serve, in particular, for displaying warning signals which indicate that the vehicle has strayed from the vehicle lane (transversely to the direction of travel). If, for example, the vehicle has strayed from the vehicle lane over the right-hand marking (in the direction of travel) of the vehicle lane, this is determined by a sensor and transmitted to control electronics, which accordingly activate one of the additional LED fields 11 on the right-hand side (relative to the direction of travel) of the steering wheel rim 5. According to what extent the vehicle strays from the lane, further additional LED fields 11 may be activated on the right-hand side of the steering wheel rim 5.

A driver is considered to be attentive or as being in an attentive state when viewing the surrounding traffic and the surroundings. To detect an attentive state of the driver according to FIG. 2 and/or FIG. 8 a detection device 10 in the form of a camera is arranged in the rotational direction R between the screen 3 and the LED fields 2 arranged above one another, which in turn are arranged on the right side of the screen 3 relative to the straight-ahead driving direction (from the view of a driver).

An important indicator for the attentive state of the driver is, for example, the direction of vision and the eye position thereof. The attentive state may, in this case for example, be classified using the deviation of the viewing direction from the straight-ahead viewing direction (viewing the road users ahead) and/or the eye position (open, closed). Both the viewing direction and the eye position may be detected by the camera 10 and thus used for controlling the aforementioned display elements of the display device 8.

In this connection, it is provided that the display elements of the display device 8 are activated for warning a driver of reduced attentiveness (for example when the eyes of the driver are closed longer than a predefinable time interval and/or the viewing direction of the driver deviates longer than a specific time interval from a straight-ahead viewing direction).

To increase the visual perceptibility of warning signals generated by the display elements, it is provided in particular that the LED fields 2 or the further LED field 1 are provided and designed for illuminating at different frequencies and/or intensities, i.e. levels of brightness. Alternatively or additionally, texts and/or symbols may be displayed for warning the driver by the screen 3.

Moreover, haptic signals may serve to warn the driver, which according to FIG. 2 may be generated by vibrators 12 arranged in the steering wheel rim 5. So that the haptic signals generated by the vibrators 12 may be felt in every conceivable grip position for a driver, they are arranged distributed in the rotational direction R on the steering wheel rim 5 or extend alternatively in the rotational direction R over the entire periphery of the steering wheel rim 5. Such vibrators 12 may also be used in a seat of a motor vehicle associated with the driver. A use of haptic displays in the form of vibrators 12 arranged in the steering wheel rim 5 is, in particular, provided for warning a driver about straying to the side of a vehicle lane. Moreover, acoustic signals may naturally also serve to warn the driver.

The display device 8 of the steering wheel assembly 4 is always present in the field of vision of a driver due to its arrangement on the steering wheel rim 5. It is known that when using a conventional navigation system with a known communication interface 13 arranged on the central console below the dashboard according to FIG. 1, the communication interface 13 (the combination of the optical display and operating unit) is only observed for approximately 18% of the driving time, whilst an average driver looks in the straight-ahead driving direction (straight-ahead viewing direction) for approximately 72% of the driving time, so that the display device 8 of the steering wheel assembly 4 is in the field of vision of a driver for approximately 72% of the driving time. As a result, it is easier for a driver in dangerous situations to be warned and informed via the display device 8, at the same time the attention being less diverted from surrounding traffic conditions, as the display device 8 is mounted more centrally in the field of vision than a known central communication interface 13. As a result, by timely warning of a driver, accidents may be avoided and/or more effectively reduced.

Moreover, the display device 8 of the steering wheel assembly 4 relative to a known HUD 16 (head up display, i.e. display projected onto the front windscreen of a motor vehicle) according to FIG. 1 has the advantage that it is impaired less by environmental influences (for example direct solar radiation counter to the straight-ahead driving direction).

Moreover, the steering wheel assembly 4 according to FIG. 2 has actuator units which are not shown in FIGS. 8 and 9. In this case, said actuator units are two actuating levers 17 which are configured and arranged respectively on the horizontally extending spokes 7 of the steering wheel assembly 4 such that they may be actuated by a driver, for example by thumb pressure, along the longitudinal vehicle axis x. By this actuating lever 17, for example, a driving direction indicator of a motor vehicle may be activated and/or deactivated. Moreover, each of the two horizontally extending spokes 7 (horizontal relative to the straight-ahead driving position of the steering wheel rim 5) comprises one respective rocker-like actuating element 18 which may be actuated on two ends opposing one another and namely by pressing along the longitudinal vehicle axis x. Thus, in a menu displayed on the screen 3, a selection may be made by, for example, a selection region (cursor) being movable (scrolled) with one of the two actuating elements 18 upward and/or downward (along the vertical vehicle axis z in the straight-ahead driving position of the steering wheel rim 5), whilst with the respective other actuating element 18 a movement of the selection field to the left and/or to the right may result (viewed from a driver in the straight-ahead driving position of the steering wheel rim 5).

Moreover, on each of the two horizontal spokes 7 is located a simple pushbutton switch 19, one of the two pushbutton switches 19 preferably being used to confirm a specific choice, whilst the other serves to decline a selection or option displayed by the display device 8.

Figure 3A:
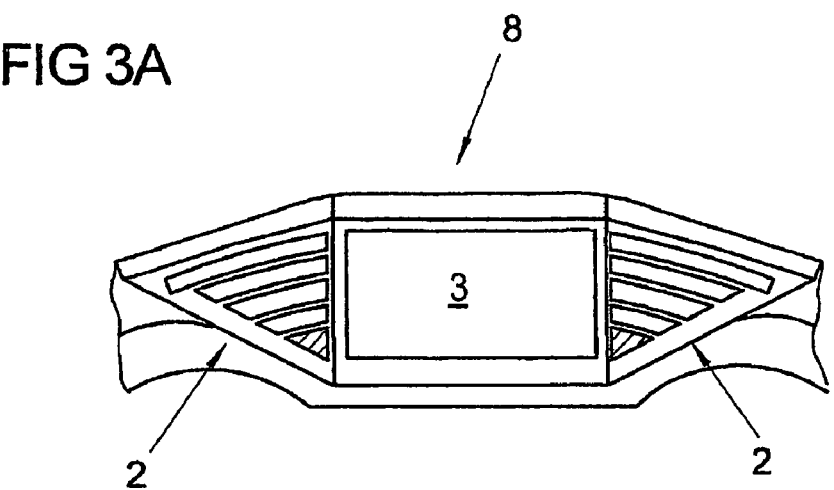
FIGS. 3a-3d illustrate a display device (LCD) of the type shown in FIG. 2, which displays optical signals for warning about too short a distance from a vehicle driving ahead.
Figure 3B:
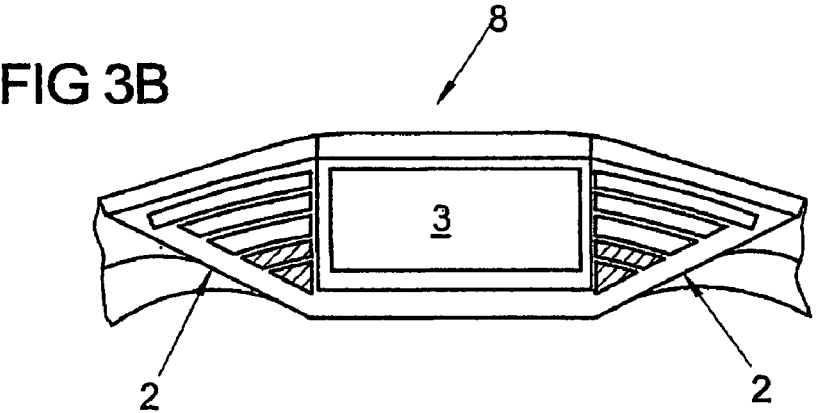
Figure 3C:
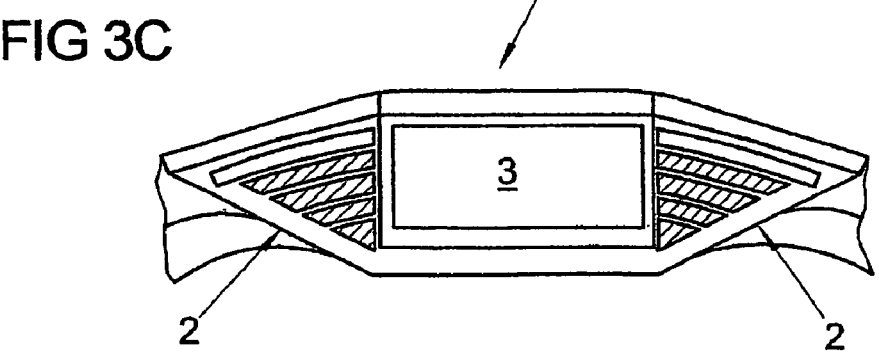
Figure 3D:
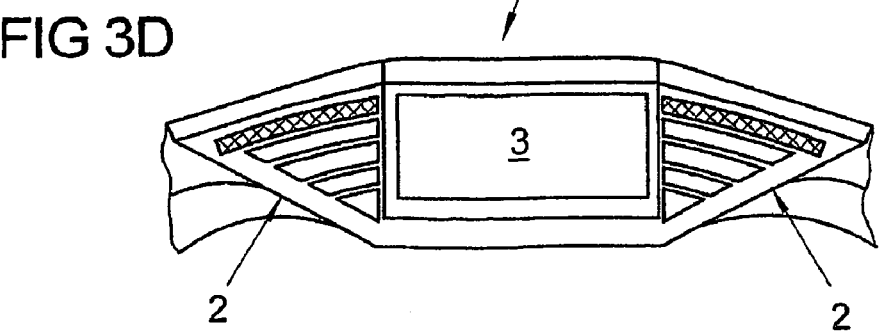
Figure 4C:
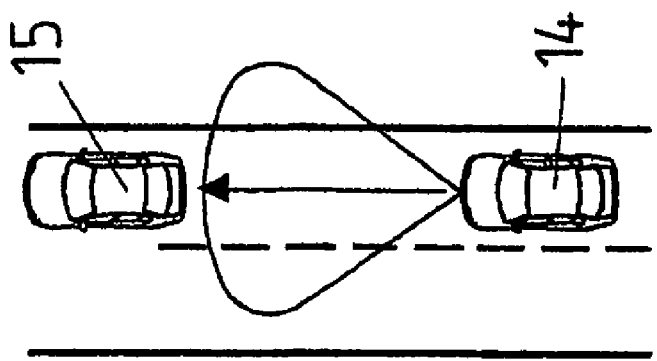
FIGS. 4a-4c are schematic views of possible collisions with an oncoming vehicle in an adjacent lane, with a vehicle in an intersecting lane and with a vehicle driving ahead in the same vehicle lane.

The LED fields 2 of the display device 8 arranged vertically above one another according to FIGS. 2, 8 and 9 of the steering wheel assembly 4 are preferably used for collision warning and/or distance signals. In this connection, at least three cases differ from one another. Firstly, with a vehicle ahead 15 on the same vehicle lane according to FIG. 4c, the distance from this vehicle 15 may be displayed by the LED fields 2 according to FIGS. 3a to 3d, when falling below a specific distance, firstly the LED fields 2 on both sides of the screen 3 placed nearer to the hub body 6 being activated (FIG. 3a) and then successively, when falling below further (respectively shorter) distances, the LED fields 2 (FIGS. 3b to 3c) arranged there over along the vertical vehicle axis z—relative to a straight-ahead driving position of the steering wheel—being activated. With an acute danger of collision, the uppermost LED fields 2 (FIG. 3d) along the vertical vehicle axis z—relative to a straight-ahead driving position of the steering wheel rim 5—and/or, with a steering wheel 5 of the type shown in FIG. 8 or 9, the further LED field 1 preferably on the outermost peripheral edge 9 of the steering wheel rim 5, are activated. Preferably the uppermost LED field 2 and/or the further LED field 1 are configured to transmit a red light for the aforementioned warning of a driver.

Figure 4B:
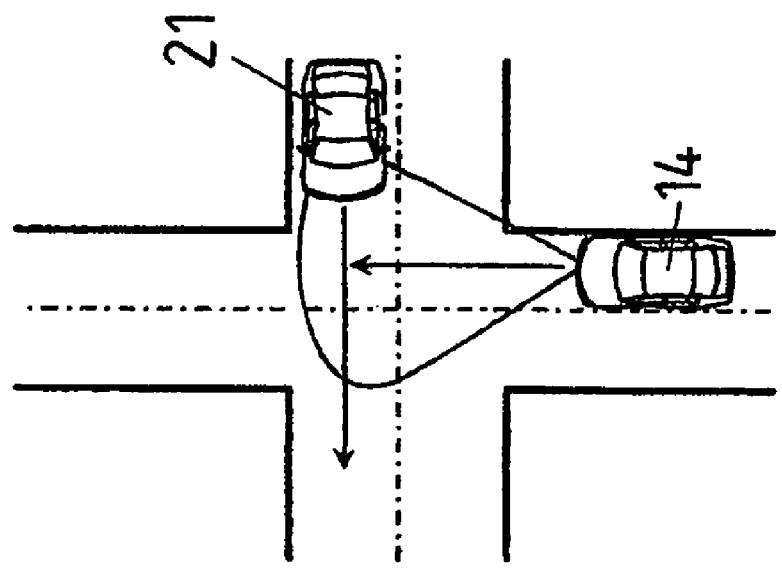
Figure 4A:
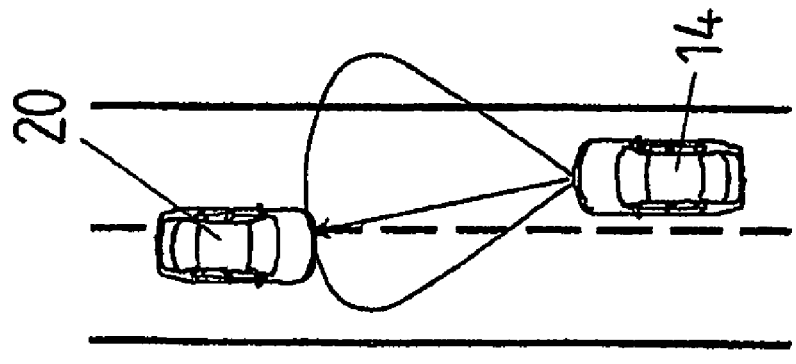
Figure 5:
FIG. 5 is a perspective view of a driver in the cockpit of a motor vehicle, the attention of the driver having been directed by the steering wheel assembly to the road (straight-ahead viewing direction), according to an embodiment.

Such a collision warning is also displayed with an oncoming vehicle 20, which according to FIG. 4a changes from an adjacent lane to the vehicle lane in which the motor vehicle 14 with the steering wheel assembly 4 is driven. Moreover, such warning signals are also activated in the event of a threatened lateral collision with a vehicle 21 crossing the lane of the motor vehicle 14, according to FIG. 4b.

Cornering speed warnings may also be displayed via the screen 3. In this connection, a sensor system determines the curvature of a bend ahead and calculates therefrom a maximum speed at which the bend is still able to be driven through without danger. If the speed of the motor vehicle is above said speed, the cornering speed warning is activated, for example in the form of a pictogram according to FIG. 9.

Moreover, information, for example a driving route detected by a navigation system, may be shown via the screen 3 of the steering wheel assembly 4. In particular before making a turning, an alteration to the direction of travel may be displayed via the screen 3, for example by displaying an arrow pointing in the future driving direction according to FIG. 2.

Figure 7:
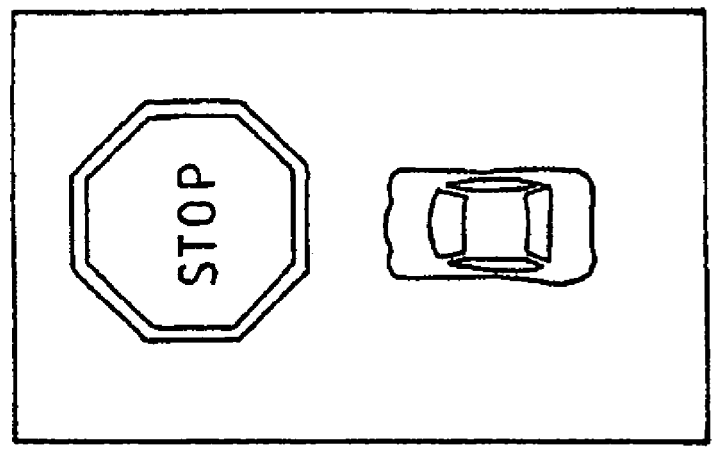
FIG. 7 is a detail view of a display device which displays an optical warning signal for warning about driving beyond a stop sign.
Figure 6:
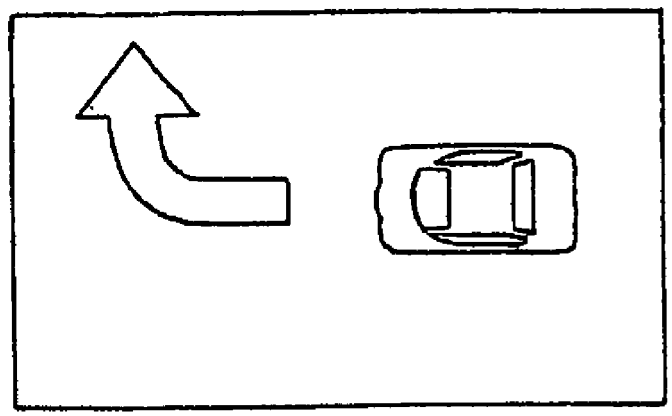
FIG. 6 is a detail view of a display device which displays an optical signal for a cornering speed warning.

It is further provided that a sensor system, for example a camera, identifies stop signs in the surroundings of a motor vehicle. Said stop signs are displayed on the screen 3 as a pictogram according to FIG. 7, optionally a brake warning being displayed, for example via the further LED field 1 or one of the LED fields 2. Preferably the further LED field 1 and/or one of the LED fields 2 are configured for this purpose to transmit a red light.

The display device 8, in particular the screen 3, may naturally also serve to display a tire pressure of a motor vehicle as well as the gasoline status of a tank of a motor vehicle and/or with an insufficient tire pressure and/or lack of gasoline, display a corresponding warning and/or an indicator. Advantageously, a driver may also be reminded via the screen 3 to fasten a seatbelt.

Particularly advantageously according to FIG. 2 and FIG. 8, a limit value of the speed of a motor vehicle (speed limit), transmitted by a transmission unit TU (not shown in FIG. 8) to the steering wheel assembly 4, may be shown via the screen 3, which limit value may be detected by a sensor device E provided therefore, which is arranged in or on the motor vehicle. The sensor device E may, therefore, read the limit value of the speed by optical sensors from signs arranged along a driving route. Alternatively or additionally, the sensor device E is configured to select the current limit value of the speed from a GPS database, in which such information is stored.

A limit value of the speed currently detected by the sensor device E is firstly displayed to a driver via the screen 3. The driver may now decide whether to accept the suggested limit value of the speed and thus transfer to a cruise controller, which as a result limits and/or regulates the speed of the vehicle to the accepted limit value of the speed or whether to decline the current detected limit value of the speed.

The actuator unit 17, 18, 19 of the steering wheel assembly 4 coupled to the cruise controller and the display device serves to accept and/or decline the suggestion, preferably by a single actuation of the actuator unit 17, 18, 19, for example by pressing one of the two pushbutton switches 19, the detected limit value of the speed being accepted.

The driver also has the possibility of altering, i.e. of increasing or reducing, the suggested limit value of the speed suggested via the screen by the actuator unit. For example, the actuating levers 17 and/or the actuating elements 18 are designed and provided for this purpose.

Moreover, a tolerance range of the limit value of the speed provided by the cruise controller may be adjusted and activated by the actuator unit 17, 18, 19. The tolerance range is the speed range by which the speed of the motor vehicle is intended to deviate from the detected limit value of the speed. Thus the driver may, for example, adjust the limit value of the speed transmitted externally to the display device as always to be exceeded by 10%.

Moreover, the screen 3 is configured for displaying the current rotational speed of the engine and/or the gear in use of the transmission of a motor vehicle. In this embodiment the sensor device E is designed and provided to detect the current rotational speed and the current gear of the motor vehicle.

A functional unit in the form of evaluation electronics calculates from the detected rotational speed, depending on the current gear, a suggestion for a gear to be used, which is displayed via the screen 3 and, for example, may be accepted and/or declined by a driver by a push on a button (pushbutton switch 19). The suggestion may depend on further parameters which may be adjusted via the actuator unit 17, 18, 19 of the steering wheel assembly 4 (for example the desired driving style such as sport, economy, etc.).

Moreover, the screen 3 may also advantageously be used to display to a driver which maneuver is able to be used to park in a selected parking place (parking space). Said parking place is measured and classified for this purpose by the sensor device E, for example when driving past, i.e. it is automatically determined whether parking is possible from the size of the parking space.

Figure 10:
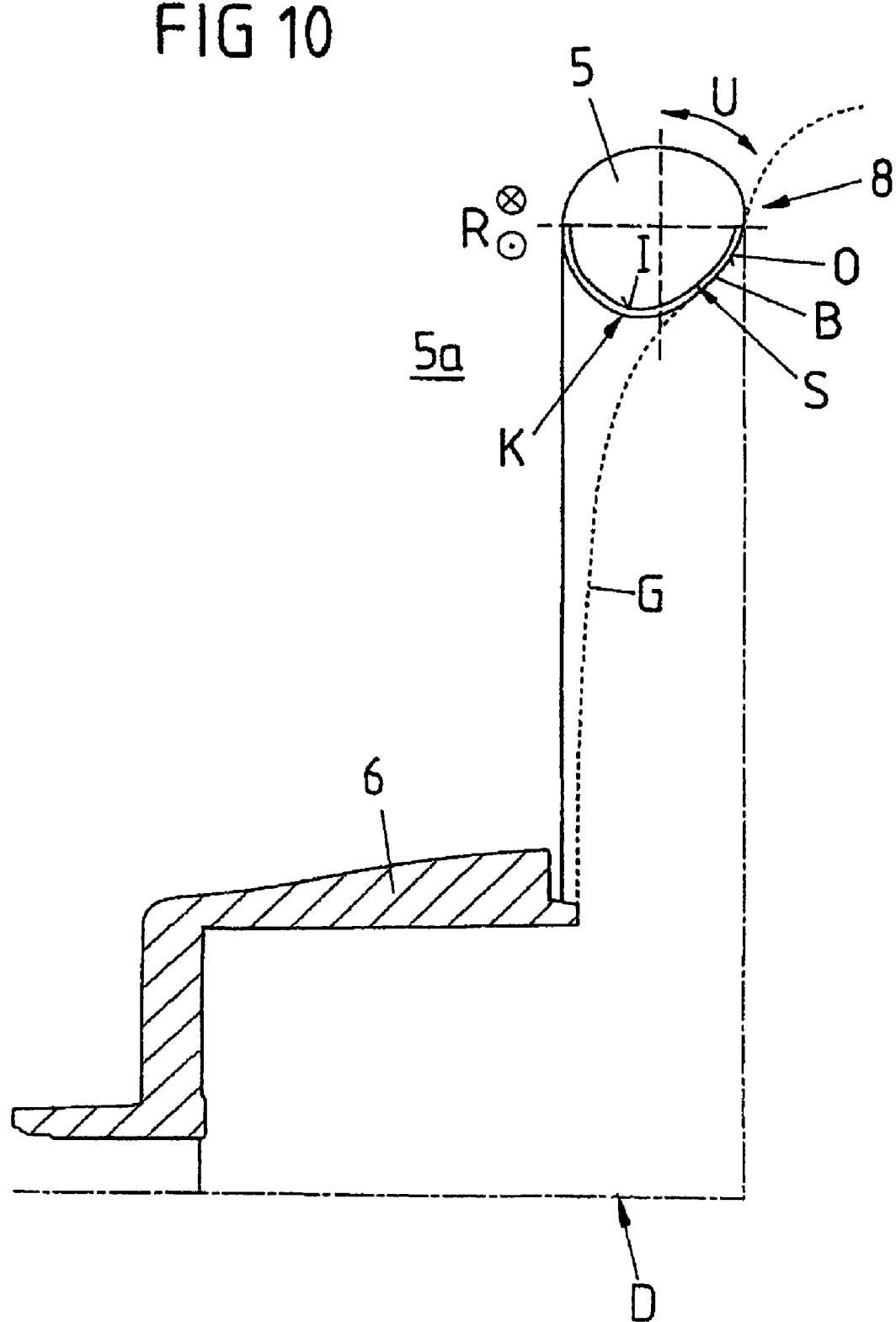
FIG. 10 is a schematic sectional view of a steering wheel of a steering wheel assembly according to an embodiment with a region for diverting an airbag which is being deployed.
Figure 11:
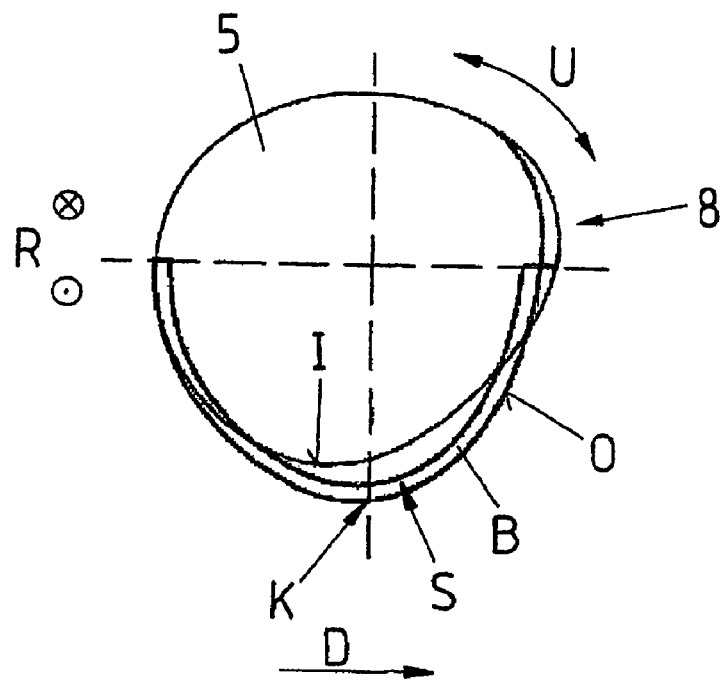
FIG. 11 is a schematic sectional view of a steering wheel rim of the steering wheel shown in FIG. 10.
Figure 12:
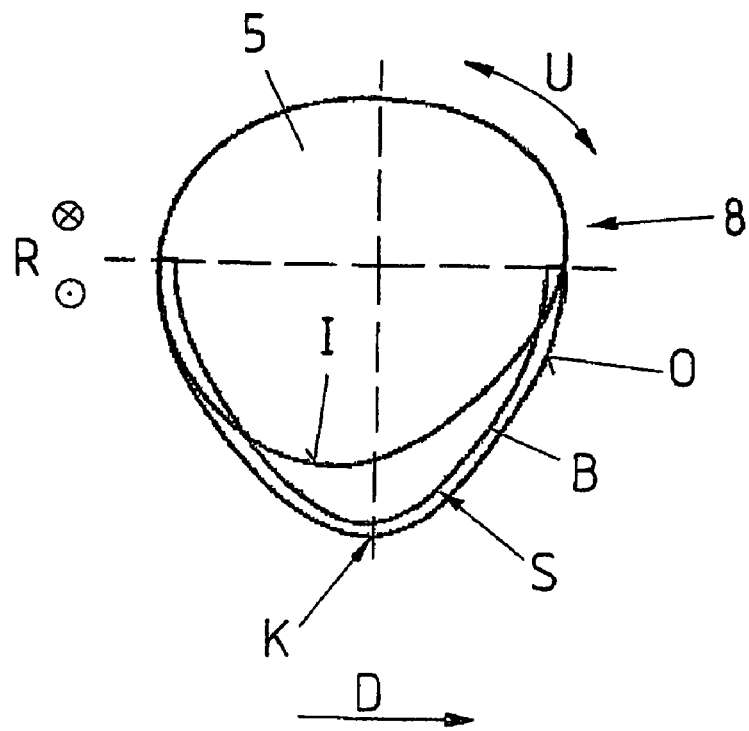
FIG. 12 is a schematic sectional view of a modification of the steering wheel rim shown in FIG. 11.

FIG. 10, in combination with FIG. 11 and FIG. 12, shows a detail of a schematic sectional view of a steering wheel 5a of a steering wheel assembly 4 of the type shown in FIGS. 2, 8 and 9, with a steering wheel rim 5 of the steering wheel 5a, which surrounds the hub body 6 in an annular manner transversely to the steering axis D. The steering axis D is located respectively in the cutting plane of FIGS. 10 to 12.

The hub body 6 forms a receiver for an airbag module, which comprises an airbag G (one part of the airbag G is indicated by a dotted line in FIG. 10) which may be deployed in a main deployment direction coinciding with the steering axis D for protecting a driver. To this end, the airbag G is inflated by a gas generator of the airbag module, not shown, the airbag G penetrating and/or blowing off a cover cap, not shown, of the hub body 6, and being deployed in the main deployment direction for protecting a driver, i.e. between the steering wheel 5a and the driver. The airbag G may, in the inflated state, be configured symmetrically to the steering axis D and/or to the main deployment direction and thus has both a spatial expansion along the steering axis D and also transversely to the steering axis D. By filling with gas provided by the gas generator, the airbag G is deployed, expanding transversely to the steering axis D and being able to impact against a region B of the steering wheel rim 5 which opposes the steering axis D transversely to the steering wheel axis D. This may occur, for example, if the airbag G is not able to be freely deployed, i.e. for example in situations in which the driver is too close to the steering wheel 5 along the steering axis D (OOP situation).

In order to ensure a diversion and/or deflection of an airbag G striking the region B, and namely such that the airbag G does not damage the steering wheel rim 5, in particular the display device 8 arranged on the steering wheel rim 5 and/or the region B, the region B comprises a deflecting ramp i.e. it is inclined relative to the steering axis D. This inclination is configured such that the airbag G strikes the region B at an angle of incidence which substantially equals a glancing angle by which it is deflected through the region B. So that this is possible over as large as possible a region in a peripheral direction U surrounding the steering wheel rim 5 in an annular manner transversely to the rotational direction R, the region B additionally has a convex curvature.

Additionally, the region B has a surface 0 facing the hub body 6 and optionally facing the driver, which is produced such that the airbag G may easily slide thereon (low friction). Moreover, the region B may be restricted to the surroundings of the display device 8, and extend in the rotational direction R and/or in the peripheral direction U along the display device 8. It may, however, also surround the steering wheel rim 5 and/or the steering axis D in an annular manner in the rotational direction R.

The region B of the steering wheel rim 5 formed as described above may be configured on one or more shell elements S which are arranged on one inner face I of the steering wheel rim 5 facing the hub body 6.

In a cutting plane in which the steering axis D is located, these shell elements S have a contour which in the region of the display device 8 deviate from the contours of the display device 8 along portions of the steering wheel rim 5 spaced apart in the rotational direction R. It is, however, also possible that the contours in the region of the display device 8 substantially identically coincide with the remaining contours of the steering wheel rim portions, which are spaced apart from the display device 8 in the rotational direction R. Alternatively to the shell elements S, a foam portion of the steering wheel rim 5 may also be provided on the steering wheel rim 5 along the display device 8 and which has a correspondingly configured region B for deflecting the airbag G.

The shell element S shown in FIG. 11 has, in the region B of the shell element S facing the hub body 6 as well as facing a driver, a convex bulged portion which is more curved than an opposing region of the steering wheel rim 5 facing the region B, in contrast to FIG. 12 the shell element S, which is U-shaped in cross section according to FIG. 11, having a greater curvature in the region B than in a region of the shell element S opposing the region B along the steering axis D. As a result, the shell element S shown in FIG. 11 along the steering axis D has a lower maximum width than the steering wheel rim 5 so that said steering wheel rim projects beyond the shell element S along the steering axis D.

The modification of the shell element S shown in FIG. 12 is also of U-shaped configuration in cross section, i.e. curved in a convex manner, and configured symmetrically along an axis extending transversely to the steering axis D, the size of the maximum width of said shell element S coinciding with that of the steering wheel rim 5 along the steering axis D. At the free ends of the shell element S an outer surface of the shell element S facing away from the steering wheel rim 5, is flush-fitted into an outer (facing outward) surface of the steering wheel rim 5 and extends tangentially thereto, so that a smooth transition between the shell element S and the steering wheel rim 5 is ensured. This is advantageous as, consequently, edges which may damage the airbag G when striking the region B, are avoided from the start.

It is important that both embodiments of the shell element S have a bulged portion, such that the region B is configured to be inclined relative to the steering axis D (and curved transversely to the steering axis D) which ensures a deflection and/or diversion of the airbag G being deployed. It is advantageous if the U-shaped cross-sectional contour of the shell element S according to FIG. 11 and/or 12 has a rounded tip K facing substantially toward the hub body 6, i.e. has a convex curved region which faces the hub body 6 and has the greatest curvature of the cross-sectional contour (the U-shaped cross-sectional contour of the shell element S may, for example, be a half-ellipse), the region B of the shell element S being arranged along the steering axis D between said tip K and a driver. As a result, the airbag G which is being deployed may advantageously be deflected along the steering axis D through the region B.

Moreover, the shell element(s) S may partially or completely cover the display device 8, and with an optical display device 8 may be of transparent configuration. Alternatively thereto, the shell elements S may be arranged along the steering wheel rim 5 to the right and to the left of a display device 8 arranged on the steering wheel rim 5, i.e. surround said display device along the steering wheel rim 5. As a result, the display device 8 is protected, as the shell elements S according to FIG. 11 and FIG. 12 in the region B project from the steering wheel rim 5 and thus project beyond a display device 8 arranged in the steering wheel rim 5 and/or inserted therein, i.e. between the display device 8 and an airbag G which is being deployed. This protective function is assisted by the inclination of the region B relative to the steering axis D (i.e. the region B forms a deflecting ramp) and the curvature of the region B which ensures a diversion and/or deflection of an airbag G which is being deployed.

This application claims priority to U.S. Provisional Application No. 60/644,575, filed Jan. 19, 2005 and Germany Priority Application Nos. 10 2005 003 187.0, filed Jan. 19, 2005 and 10 2005 054 640.4, filed Nov. 10, 2005, all of which, including the specifications, drawings, claims and abstracts, are incorporated herein by reference in their entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A steering wheel assembly for a motor vehicle, comprising:
    a steering wheel;
    a display device arranged on the steering wheel and configured to cooperate with a sensor device arranged on the motor vehicle for detecting at least one parameter of a motor vehicle, the display device displaying the parameter detected by the sensor device;
    a functional unit of the motor vehicle for forwarding or converting energy and/or information being coupled to the sensor device, the functional unit being configured to display to a driver via the display device a suggestion for adjusting a parameter of the motor vehicle; and
    an actuator unit of the motor vehicle being associated with the functional unit, by which the parameter may be adjusted according to the suggestion of the functional unit;
    wherein the parameter includes a distance from a vehicle ahead;
    wherein the suggestion offers a distance from a vehicle ahead for acceptance, the acceptance of the suggestion affecting the regulation of the speed of the motor vehicle; and
    wherein the actuator unit is arranged on the steering wheel and is configured for accepting and declining the suggestion by action on the actuator unit.

2. The steering wheel assembly as claimed in claim 1, wherein the adjustment of the parameter comprises a confirmation of, or an alteration to, the parameter.

3. The steering wheel assembly as claimed in claim 1, wherein the actuator unit is configured to accept or decline the suggestion via a single actuation of the actuator unit.

4. The steering wheel assembly as claimed in claim 1, wherein the suggestion is altered by the actuator unit.

5. The steering wheel assembly as claimed in claim 1, wherein the functional unit provides a predefinable time interval within which the actuator unit has to be actuated for an effective acceptance of the suggestion.

6. The steering wheel assembly as claimed in claim 1, wherein the functional unit is configured as a cruise controller.

7. The steering wheel assembly as claimed in claim 1, wherein the parameter is a speed of the motor vehicle.

8. The steering wheel assembly as claimed in claim 1, wherein the suggestion offers a limit value of the speed detected by the sensor device for acceptance, the acceptance of the suggestion effecting the restriction of the speed of the motor vehicle to the limit value of the speed by the cruise controller.

9. The steering wheel assembly as claimed in claim 1, wherein the functional unit provides a tolerance range activated by the actuator unit, by which the parameter is intended to fall below and/or exceed a limit value of the parameter.

10. The steering wheel assembly as claimed in claim 1, wherein the sensor device is provided and designed to read a limit value of the parameter from a display in surroundings of a motor vehicle.

11. The steering wheel assembly as claimed in claim 1, wherein the sensor device is configured to select a limit value of the parameter from a data store arranged in surroundings of a motor vehicle.

12. The steering wheel assembly as claimed in claim 1, wherein the sensor device is configured to select a limit value of the parameter from a GPS database.

13. The steering wheel assembly as claimed in claim 1, further comprising a transmission unit to transmit output signals of the sensor device to the display device.

14. The steering wheel assembly as claimed in claim 1, wherein the parameter is a current rotational speed of an engine of the motor vehicle.

15. The steering wheel assembly as claimed in claim 14, wherein the sensor device is configured to detect the current gear of a transmission of the motor vehicle.

16. The steering wheel assembly as claimed in claim 14, wherein the suggestion relates to a gear to be used, the acceptance of the suggestion effecting an engagement of the suggested gear.

17. The steering wheel assembly as claimed in claim 16, wherein the functional unit is configured as evaluation electronics connected to the display device, which are configured to display to a driver via the display device the suggestion, at least depending on the current rotational speed and the current gear.

18. The steering wheel assembly as claimed in claim 1, wherein the sensor device is configured to detect further parameters of a motor vehicle.

19. The steering wheel assembly as claimed in claim 18, wherein the display device is configured to display the further parameters.

20. The steering wheel assembly as claimed in claim 18, wherein the parameters are distances between a motor vehicle and an object in surroundings of the motor vehicle.

21. The steering wheel assembly as claimed in claim 20, wherein the sensor device is a configured to convert the distances into a dimension of a parking space.

22. The steering wheel assembly as claimed in claim 18, wherein the sensor device is configured to detect whether a parking space is large enough in the surroundings of the motor vehicle, in order to park the motor vehicle in said parking space.

23. The steering wheel assembly as claimed in one of claim 18, wherein the sensor device is configured to display information about a parking space via the display device.

24. The steering wheel assembly as claimed in claim 18, wherein the functional unit is configured as control electronics connected to the sensor device, which are configured to automatically park a motor vehicle.

25. The steering wheel assembly as claimed in claim 1, wherein the display device is arranged on a steering wheel rim which at least partially surrounds a steering axis of the steering wheel.

26. The steering wheel assembly as claimed in claim 25, wherein the display device is arranged in a straight-ahead driving position of the steering wheel along the vertical vehicle axis above the steering axis.

27. The steering wheel assembly as claimed in claim 1, wherein the display device is configured to display driving information of a motor vehicle.

28. The steering wheel assembly as claimed in claim 1, further comprising at least one detection device arranged on the steering wheel for detecting an attentive state of a driver of a motor vehicle, the detection device being configured to activate the display device depending on the detected attentive state of the driver.

29. The steering wheel assembly as claimed in claim 28, wherein the detection device is a camera.

30. The steering wheel assembly as claimed in claim 28, wherein the detection device is arranged adjacent to the display device.

31. The steering wheel assembly as claimed in claim 28, wherein the detection device is arranged on a steering wheel rim and wherein the display device is arranged on the steering wheel rim.

32. The steering wheel assembly as claimed in claim 28, wherein the detection device is arranged along a vertical vehicle axis above a steering axis in a straight-ahead driving position of a steering wheel rim.

33. The steering wheel assembly as claimed in claim 1, wherein the display device comprises at least two display elements.

34. The steering wheel assembly as claimed in claim 33, wherein the detection device is arranged along the steering wheel rim between the at least two display elements.

35. The steering wheel assembly as claimed in claim 33, wherein the distance between the detection device and respectively one of the two display elements is smaller than a width of at least one of the two display elements along the steering wheel rim.

36. The steering wheel assembly as claimed in one of claim 28, further comprising additional detection devices to detect an attentive state of a driver of a motor vehicle which activate the display device depending on the detected attentive state of the driver.

37. The steering wheel assembly as claimed in claim 36, wherein the additional detection devices are cameras.

38. The steering wheel assembly as claimed in claim 36, wherein the detection devices are arranged along a steering wheel rim such that at least one of the detection devices is arranged irrespective of a position of the steering wheel rim along a vertical vehicle axis above a steering axis.

39. The steering wheel assembly as claimed in claim 25, further comprising a hub body which may be rotated about a steering axis and which is connected to the steering wheel rim via at least one spoke.

40. The steering wheel assembly as claimed in claim 39, further comprising a region of the steering wheel rim which comprises the at least one display device.

41. The steering wheel assembly as claimed in claim 40, further comprising an airbag module arranged on the hub body with an airbag, which may be deployed to protect the driver in a main deployment direction extending along the steering axis and when deployed may impact against a region of the steering wheel rim transverse to the steering axis.

42. The steering wheel assembly as claimed in claim 41, wherein the region of the steering wheel rim cooperates with the airbag such that said airbag, when impacting against the region, is deflected in the main deployment direction.

43. The steering wheel assembly as claimed in claim 42, wherein the region for deflecting the airbag which is being deployed comprises a deflecting ramp.

44. The steering wheel assembly as claimed in claim 42, wherein the region for deflecting the airbag which is being deployed comprises a surface with a low coefficient of friction.

45. The steering wheel assembly as claimed in claim 1, wherein the display device is an optical display.

46. The steering wheel assembly as claimed in claim 45, wherein the optical display comprises at least one LED.

47. The steering wheel assembly as claimed in claim 45, wherein the optical display comprises a plurality of LEDs.

48. The steering wheel assembly as claimed in claim 47, wherein the optical display comprises an LED field.

49. The steering wheel assembly as claimed in claim 45, wherein the optical display comprises a screen.

50. The steering wheel assembly as claimed in claim 1, wherein the display device is an acoustic display.

51. The steering wheel assembly as claimed in claim 1, wherein the display device is a haptic display.

52. The steering wheel assembly as claimed in claim 1, wherein the sensor device is configured to detect a limit value of a parameter of a motor vehicle.

53. A method for adjusting a limit value of the speed of a motor vehicle with a steering wheel assembly as claimed in claim 1, comprising the following steps:
   detecting a limit value of the speed of a motor vehicle by the sensor device;
   displaying the limit value of the speed detected by the sensor device via the display device, the acceptance of a limit value of the speed detected by the sensor device being suggested to a driver by a cruise controller via the display device;
   accepting or declining the suggestion by an actuator unit arranged on the steering wheel; and
   after accepting the suggestion, regulating the speed of the motor vehicle by the cruise controller to the limit value of the speed.

54. The method as claimed in claim 53, wherein further parameters of a motor vehicle are detected by the sensor device.

55. The method as claimed in claim 54, wherein distances between a motor vehicle and objects in surroundings of the motor vehicle are detected as parameters.

56. The method as claimed in claim 55, wherein the distances are automatically converted into a variable of a parking space.

57. The method as claimed in claim 56, wherein a free parking space is identified and measured by the sensor device, the free parking space being automatically verified whether the parking space is sufficiently large in order to park the motor vehicle thereon, and information about the parking space is displayed to a driver via the display device.

* * * * *